United States Patent [19]

Zelez et al.

[11] Patent Number: 5,976,270
[45] Date of Patent: Nov. 2, 1999

[54] COMPOSITION AND METHOD FOR TREATMENT OF LEAD-CONTAINING SURFACE COATINGS AND SOIL

[76] Inventors: Joseph Zelez, R.R. 2, Box 473E, Henryville, Pa. 18332; Anthony Peter Balestrieri, 2019 Lake Dr., Folsom, N.J. 08037-9115; Robert Howard, 11A Oak Dr., Shamong Township, N.J. 08088

[21] Appl. No.: 08/998,206

[22] Filed: Dec. 24, 1997

Related U.S. Application Data

[62] Division of application No. 08/599,632, Feb. 9, 1996, Pat. No. 5,741,366.

[51] Int. Cl.$^6$ .................................................... B08B 3/08
[52] U.S. Cl. ............................ 134/28; 134/2; 134/3; 134/38; 510/201; 510/203; 510/207; 510/241; 510/242; 510/435; 588/231; 588/236; 588/249; 588/256; 588/260
[58] Field of Search .................................. 134/2, 3, 382; 510/201, 203, 241, 242, 435; 588/231, 236, 249, 256, 260

[56] References Cited

U.S. PATENT DOCUMENTS

| | | | |
|---|---|---|---|
| 1,785,245 | 12/1930 | Bowman | 134/3 |
| 2,408,931 | 8/1946 | Heath | 134/3 |
| 2,689,785 | 9/1954 | Simon | 134/3 |
| 2,981,642 | 4/1961 | Danaczko | 134/2 |
| 3,355,385 | 11/1967 | Mackley | 252/104 |
| 4,426,250 | 1/1984 | Brailsford | 156/655 |
| 4,508,634 | 4/1985 | Elepano et al. | 282/163 |
| 4,608,091 | 8/1986 | Sullivan et al. | 134/3 |
| 4,927,556 | 5/1990 | Pokorny | 252/173 |
| 5,089,164 | 2/1992 | Stanley | 252/162 |
| 5,106,525 | 4/1992 | Sullivan | 252/162 |
| 5,127,963 | 7/1992 | Hartup et al. | 134/26 |
| 5,162,600 | 11/1992 | Cody et al. | 588/236 |
| 5,202,033 | 4/1993 | Stanforth et al. | 210/747 |
| 5,215,675 | 6/1993 | Wilkins et al. | 252/100 |
| 5,232,619 | 8/1993 | Sue | 252/102 |
| 5,234,485 | 8/1993 | Bólsing | 71/27 |
| 5,741,366 | 4/1998 | Zelez et al. | 134/2 |

OTHER PUBLICATIONS

Merck Index, 10$^{th}$ Edition, p. 4709, "Hydrogen Peroxide Solution 30", 1983.
Niosh Manual of Analytical Methods, Methods 0700, May 11, 1992.
Title X——Residential Lead–Based Paint Hazard Reduction Act of 1992, Subtitle B, pp. 251–252.

*Primary Examiner*—Jill Warekeb
*Assistant Examiner*—S. Carrillo
*Attorney, Agent, or Firm*—Kenneth A. Benson

[57] ABSTRACT

A method is provided to render non-hazardous surface soil which is contaminated with lead compounds. The soil is treated by applying an aqueous composition comprising hydrogen peroxide, ammonium hydroxide, nitric acid and acetic acid and allowing said composition to migrate through the soil.

2 Claims, No Drawings

COMPOSITION AND METHOD FOR TREATMENT OF LEAD-CONTAINING SURFACE COATINGS AND SOIL

This application is a division of Ser. No. 08/599,632 filed Feb. 9, 1996 now U.S. Pat. No. 5,741,366.

BACKGROUND OF THE INVENTION

The present invention relates to compositions for the treatment of lead-based and lead-containing surface coatings or soil for the purpose of rendering said surface coatings or soil non-hazardous to humans. Specifically, the compositions are useful for the removal of lead-based paints from interior and exterior surfaces of a structure and for the treatment of lead-contaminated soil.

Lead-based coatings, for example, lead-based paint, may contain such compounds as lead chromate, lead molybdate, lead sulfate, lead borate, lead carbonate, lead monoxide, lead tetroxide, lead vanadate and lead antimonate. Soil surrounding public, private or Indian housing and structures of business may contain tetraethyl lead and perhaps other lead compounds.

Title X—Residential Lead-based Paint Hazard Reduction Act of 1992 defines by amendment to the Toxic Substances Control Act "lead-based paint" as paint on surfaces with lead in excess of 1.0 mg/cm$^2$ as measured by a spectrum analyzer or direct reading x-ray fluorescence (XRF) detector, or 0.5 percent by weight. The XRF threshold had been established in the 1988 amendment to the Lead-based Paint Poison Prevention Act and remains unchanged. Title X's explicit standard of 0.5 percent by weight focuses attention and resources on surfaces with high levels of lead.

Title X also defines "lead-based paint hazard" as any condition that causes exposure to lead sufficient to cause adverse human health effects and it cites six situations which are:

Deteriorated lead-based paint such as any exterior or interior lead-based paint that is peeling, chipping, chalking or cracking, or is located on any surface or fixture that is damaged or deteriorated.

Lead-based paint on any "friction surface", an interior or exterior surface subject to abrasion or friction, such as painted floors.

Lead-based paint on any "impact surface", an interior or exterior surface subject to damage by repeated impacts such as parts of door frames.

Lead-based paint on any "accessible surface", an interior or exterior surface accessible to a young child to mouth or chew, such as a window sill.

"Lead-contaminated dust", surface dust in residential dwellings that contain an area or mass concentration of lead in excess of the standard to be established by the Environmental Protection Agency.

"Lead-contaminated soil", bare soil on residential property that contains lead in excess of the standard to be established by the Environmental Protection Agency.

Title X also defines "abatement" as any set of measures designed to permanently eliminate lead-based paint hazards in accordance with standards established by appropriate Federal agencies. Such abatement includes:

(A) the removal of lead-based paint and lead-contaminated dust, the permanent containment or encapsulation of lead-based paint, the replacement of lead-painted surfaces or fixture and the removal or covering of lead-contaminated soil; and (B) all preparation, clean-up, disposal and postabatement clearance testing activities associated with such measures.

Present state-of-the-art procedures for removing lead-based paint have serious disadvantages. The procedure described in U.S. Pat. No. 4,426,250 uses very caustic chemicals such as hydroxides of sodium, potassium, calcium and magnesium. A paste containing such chemicals is applied to the painted surface and is then covered with a fabric during at least part of the treatment period. The method is time consuming and relatively hazardous.

In recent years, the most commonly used paint stripping compositions have contained halogenated hydrocarbon chemicals, such as methylene chloride. Since such chemicals are suspected to be carcinogenic, there have been many attempts to replace them with combinations of other organic chemicals. U.S. Pat. No. 5,089,164 is one reference which describes paint stripping compositions which contain among other organic constituents a significant amount of N-methyl-pyrrolidone. It is our understanding that in the presence of water these compositions have significantly lower stripping rates than compositions containing methylene chloride and that organic stripping agents are not easily washed from the stripped surface.

Some stripping compositions have contained peroxides such as those described in U.S. Pat. No. 3,355,385. These compositions, however, contain very volatile and flammable solvents which render the life of the composition as a stripping agent very short. U.S. Pat. No. 5,215,675 combines the use of hydrogen peroxide with water soluble esters in aqueous stripping compositions to eliminate such problems.

All of the above stripping compositions contain organic solvents and stripping agents which are not easily washed from the treated surface. Also, none of these references indicate that the compositions are useful for the stripping of lead-based paints.

Treatment of lead in soil has been limited in the prior art to immobilizing the lead by converting lead containing compounds to non-leachable forms. Examples of such immobilization are shown in U.S. Pat. Nos. 5,162,600, 5,202,033 and 5,234,485.

It is an object of this invention to provide an effective aqueous based composition for the abatement of lead whether it be in lead-based paint or in surface soils.

SUMMARY OF THE INVENTION

This invention provides an improved chemical composition which is formulated to render non-hazardous all surfaces which have been coated with lead-based paints and surface soil which is contaminated with lead compounds. The chemical composition is an aqueous mixture comprising about 10 to 20 percent by volume of a 30% by weight hydrogen peroxide solution, about 10 to 20 percent by volume ammonium hydroxide, about 10 to 20 percent by volume concentrated nitric acid, about 10 to 20 percent by volume glacial acetic acid, the remainder being water.

DETAILED DESCRIPTION OF THE INVENTION

When mixed in the approximate amounts of the following parts by volume; namely, one part of a 30% by weight hydrogen peroxide solution, one part ammonium hydroxide, one part concentrated nitric acid, one part glacial acetic acid and three parts distilled water; a solution is formed which can be advantageously used to render non-hazardous all surfaces which are coated with lead-based paints of any composition and surface soils which are contaminated with lead in any form. When treated with a solution containing all four of the above mentioned components, all lead-based paints and coatings are decomposed and can be easily removed from the surface on to which they have been coated.

When the solution is to be used on a vertical or near-vertical surface, it may be desirable to add to the mixture one or more thickening agents such as gelatin, flour, starches, cellulose compounds, and clays. By raising the viscosity of the solution it may adhere to a given surface for a longer period of tome and allow a more effective use of the composition. Such thickening agents do not affect the performance of the solution in rendering surfaces non-hazardous.

The solution when constituted with all four of the above mentioned ingredients will also substantially remove all types of lead compounds from surface soil when the solution is passed through the soil. Current standards are that an area on a residential property on which the soil contains more than 0.50% by weight lead must be paved over or the soil removed. In soil immediate to house perimeters the upper acceptable limit is 0.20% by weight lead. In children's play areas and alike the upper acceptable limit is 0.04% by weight lead. One can see from the following examples that the compositions of this invention can be effective in reducing the lead content of soil to acceptable limits.

The following examples are given to show the invention and its use. They are not meant to be restrictive in any way.

EXAMPLE 1

A fuel oil storage tank was found to have a coating which contained 0.6 $mg/cm^2$ of lead determined by a surface measurement performed using a spectrum analyzer X-ray fluorescence (XRF) detector. 70 cc of a mixture of three parts distilled water, one part 30% hydrogen peroxide, one part ammonium hydroxide, one part concentrated nitric acid and one part glacial acetic acid (all by volume) was poured on the vertical side of the coated tank. It ran down the side of the coated tank reacting with the surface which it contacted and removing the paint from the surface which it contacted. Distilled water was poured onto the same surface to neutralize it and the surface was dried with a cloth. The treated surface was found to be non-hazardous by testing with NIOSH method 0700 (Lead in Surface Wipe Samples). The analysis of the wipe sample was less than 10 $\mu mg/ft^2$.

EXAMPLE 2

A window sill whose surface contained 9.8 $mg/cm^2$ of lead as measured by an XRF spectrum analyzer was treated with a solution with the same composition as described in Example 1. After being poured on the surface of the window sill, there was a reaction of the solution with the paint on the surface as indicated by bubbling and foaming of the solution. Reaction had subsided after about two hours at which time distilled water was poured on the surface to neutralize the material on the surface and the surface was wiped dry. After drying, the lead content of whatever remained on the surface was found to be in corners, where caulk had been used on top of the paint, to be 0.79 $mg/cm^2$ and on the flat surfaces to be 0 $mg/cm^2$. The surface residual material was shown to be non-hazardous by the NIOSH method 0700 which showed a wipe analysis of about 200 $\mu gm/ft^2$.

EXAMPLE 3

A sample of surface soil was found to contain 0.52% by weight lead using inductively coupled plasma atomic emission spectroscopy. 0.12 $ft^3$ of this soil was placed in a colander and 70 cc of a solution made as described in Example 1 was distributed evenly over the surface of the soil. Over a twenty-four hour period some of the liquid passed through the soil and was evaporated. The treated soil was then found to contain only 0.22% by weight lead as measured by inductively coupled plasma atomic emission spectroscopy.

EXAMPLE 4

A second sample of surface soil containing 0.52% by weight lead as measured by inductively coupled plasma atomic emission spectroscopy was treated in exactly the same manner as the sample in Example 3. The treated soil was found to contain 0.14% by weight lead as measured by the same means.

EXAMPLE 5

A sample of surface soil was found to contain 1.00% by weight lead ay inductively coupled plasma atomic emission spectroscopy. 0.12 $ft^3$ of the soil was treated as described in Example 3. After treatment the soil contained 0.18% by weight lead as measured by the same means.

EXAMPLE 6

A deteriorated lead-based painted surface showed 9.8 $mg/cm^2$ using the spectrum analyzer XRF detector. 10 grams of paint chipped from this surface were treated in a glass jar with 140 cc of solution the composition of which was the same as the solution described in Example 1. After 24 hours the solution was poured from the chips and they were rinsed with about 200 cc of distilled water. At this point the chips contained 0.08% by weight lead as determined by inductively coupled plasma atomic emission spectroscopy. This is much below the 0.5% level considered to be hazardous.

EXAMPLE 7

A representative sample of surface soil contaminated with lead and the soil beneath it was placed in a clear plastic cylinder which was 137 cm long and had an internal diameter of 11.4 cm. The bottom 122 cm contained uncontaminated subsurface soil and the top 15 cm contained soil contaminated with 1.00% by weight lead. With the packed cylinder in a vertical position 70 cc of the solution as described in Example 1 was poured on top of the soil. After 24 hours samples taken from the upper contaminated region, from the mid-point of the cylinder and from the lowest point in the cylinder showed 0.13%, 0.01% and 0.009% by weight lead respectively.

EXAMPLE 8

Four ounces of gelatin were mixed with 70 cc of the solution described in Example 1. After setting, the viscosity of the solution was sufficient to wet a surface whose contact angle was 86°. This mixture will wet a vertical surface.

EXAMPLE 9

Three ounces of ordinary household flour were mixed with 70 cc of the solution described in Example 1. A paste was formed which could easily be applied to non-horizontal surfaces.

The above examples show how the solution of this invention can be used to effectively treat lead contaminated surfaces or soil to make them non-hazardous. The solution is particularly effective on concrete surfaces. When the solution was in contact with a coated concrete surface for a period of 24 hours before the surface was neutralized with water, the surface of the concrete retained its integrity. The lead-based surface coating was removed and there was no noticeable powdering or breakdown of the surface of the concrete.

Good retention of surface properties was also experienced when using the solution of this invention on wallboard and plaster which had been coated with a lead-based paint. Since wallboard and plaster are mainly used on vertical surfaces, the active solution is on the surface for a very short time. In spite of this, the solution was found to be very effective in removing the lead-based coating from the wallboard and plaster without affecting the integrity of the wallboard or the plaster surfaces. It was very surprising that the lead-based paint was removed from the surface of the wallboard without affecting the felt paper on the surface of the wallboard and without affecting the structure integrity of the wallboard. In like manner a plaster surface was unaffected. This is an extremely important finding since many lead-based paint abatement programs specify the removal of wallboard and demolition of plaster walls because removal is the only suitable means known to those who formulate the specifications.

It is not desirable to substitute other acids for those specified in the invention. Hydrofluoric acid is too dangerous a chemical to work with in the methods of this invention. Also, when hydrofluoric acid was placed in compositions similar to those of the invention, the composition would etch window pane in a most undesirable way.

If sulfuric acid were substituted in the compositions of the invention for either the nitric acid or the acetic acid, the composition had to be heated to 150° F. for effective removal of lead-based paint from a wooden surface.

Use of hydrochloric acid was equally unsatisfactory. Compositions containing hydrochloric acid did not affect a lead-based painted wooden surface even after 36 hours of contact.

The above examples show that the composition of the invention performs well in abatement of lead-based coatings regardless of the surface on which they are coated and without detriment to the environment of the coatings.

We claim:

1. A method for treating lead contaminated surface soil comprising: (a) applying an aqueous composition comprising about 10 to 20 percent by volume of a 30% by weight hydrogen peroxide solution, about 10 to 20 percent by volume ammonium hydroxide, about 10 to 20 percent by volume concentrated nitric acid, about 10 to 20 percent by volume glacial acetic acid to the surface of said soil and (b) allowing said composition to migrate through said soil.

2. The method for treating the lead-contaminated surface soil according to claim 1 wherein said aqueous composition is comprised of about one part by volume of a 30% by weight hydrogen peroxide solution, about one part by volume ammonium hydroxide, about one part by volume concentrated nitric acid, about one part by volume glacial acetic acid, and about three parts by volume water.

* * * * *